(12) United States Patent
Wheatley

(10) Patent No.: US 6,386,616 B1
(45) Date of Patent: May 14, 2002

(54) MECHANISM FOR RETAINING THE POSITION OF SNAP FASTENERS ON A TONNEAU COVER RAIL

(76) Inventor: Donald G. Wheatley, 4451 Ford Rd., Ann Arbor, MI (US) 48105

( * ) Notice: Subject to any disclaimer, the term of this patent is extended or adjusted under 35 U.S.C. 154(b) by 0 days.

(21) Appl. No.: 09/781,767

(22) Filed: Feb. 12, 2001

(51) Int. Cl.[7] .................................................. B60P 7/04
(52) U.S. Cl. .................................................. 296/100.16
(58) Field of Search ....................... 296/100.16, 100.18, 296/100.15; 160/371, 368.1, 327, 369

(56) References Cited

U.S. PATENT DOCUMENTS

| 4,730,866 A | * | 3/1988 | Nett ........................ 296/100.18 |
| 4,838,602 A | | 6/1989 | Nett |
| 5,152,574 A | * | 10/1992 | Tucker .................... 296/100.18 |
| 5,207,262 A | | 5/1993 | Rushford |
| 5,261,719 A | | 11/1993 | Tucker |
| 5,310,238 A | | 5/1994 | Wheatley |
| 5,331,993 A | | 7/1994 | Billbury |
| 5,365,994 A | | 11/1994 | Wheatley et al. |
| 5,472,256 A | * | 12/1995 | Tucker .................... 296/100.18 |
| 5,522,635 A | * | 6/1996 | Downey ................. 296/100.16 |
| 5,772,273 A | * | 6/1998 | Wheatley ............... 296/100.18 |
| 5,788,315 A | * | 8/1998 | Yucker .................... 296/100.16 |
| 5,984,400 A | * | 11/1999 | Miller et al. ......... 296/100.16 X |
| 6,024,401 A | * | 2/2000 | Wheatley et al. ....... 296/100.18 |

* cited by examiner

*Primary Examiner*—Joseph D. Pape
(74) *Attorney, Agent, or Firm*—Harness, Dickey & Pierce, P.L.C.

(57) ABSTRACT

A tonneau cover for a pick-up truck cargo box in which a flexible cover of sheet-like material is attached to a frame with snap fasteners. The snap portions carried by the frame are slidable there along to change the position of the snap fastener. The snap fasteners include a protrusion, which engages the frame and creates sufficient force to prevent the snap fastener from sliding freely along the rail and losing their longitudinal location when the tonneau cover is not attached.

46 Claims, 3 Drawing Sheets

MECHANISM FOR RETAINING THE POSITION OF SNAP FASTENERS ON A TONNEAU COVER RAIL

BACKGROUND AND SUMMARY OF THE INVENTION

The present invention relates to tonneau covers for covering a pickup truck cargo box and in particular to a nib on one half of the snap fasteners for retaining the position of that half of the snap fastener on the rail of the tonneau cover frame.

Soft tonneau covers for pick-up trucks typically have two major components. The first component is a flexible sheet cover such as vinyl coated fabric. The second component is a frame attached to the pick-up truck cargo box. The frame and cover include a fastening mechanism for attaching the cover to the frame, thus covering the cargo box. One commonly employed means for fastening the cover to the frame is the use of a plurality of snap fasteners about the periphery of the cover. One portion of each snap fastener is attached to the flexible sheet while the other portion of each fastener is carried by the tonneau cover frame.

Preferably, that portion of the snap fasteners on the frame (hereinafter "male portion" or "snap portion") are slidable along the length of the frame rails. This enables the male portion to be positioned anywhere along the length of the rail to accommodate variations in the snap location on the cover. This prevents wrinkling or excessive pulling in the cover that would occur if the male portions were fixed in location on the rail. The male portions are slidable along the rails and are prevented form sliding off the ends of the rails by the corner blocks. The male portions mounted to the rails include a generally C-shaped base that engages and slides along the snap mounting wall of the rail.

When large objects are being carried in the cargo box which extend above the cargo box walls, it is necessary to remove the tonneau cover at least partially from the cargo box. This is accomplished by rolling the cover forward and tying it at the front end of the cargo box. When this is done, however, the male portions are free to slide longitudinally along the side rails as a result of wind, vibration and other forces during movement of the truck. The male portions must be relocated back into position before the tonneau cover is remounted over the bed.

One approach to maintaining the male portions on the rail is to use a flexible steel for the base of the male portions so that the male can be crimped or otherwise formed into a C-shape which firmly grips the rail and does not easily slide unless intentionally forced. Over time, these base portions may loosen and begin to slide. However, to provide a low-cost fastener, it is preferred to form the male portion in a single injection molded part. This is less expensive and stronger than an assembled male portion having a collar member riveted to a C-shaped steel base. Unfortunately, the injection molded male portion does not have the ability to be crimped.

Accordingly, an object of the present invention is to provide a means for retaining the portions of snap fasteners in position on the tonneau rail when the tonneau cover is not attached. Another object is to provide the above while maintaining the ability to remove those snap portions and, when desired, to change the location of those snap portions.

The present invention provides a nib protruding from the snap portion's inside surface, the surface facing the tonneau rail. The nib creates a frictional interference with the rail sufficient to retain the snap portion in its location on the tonneau rail while the vehicle is moving, yet which may still be easily overcome by a person who wishes to relocate the snap portion longitudinally on the tonneau rail to accommodate variations in the location of the female snap portion on the cover, either as manufactured or as it may vary with seasonal temperatures. The nib may be centered behind a recess in the male portion or in a different location on the inside of the snap fastener. The nib may also be on a cantilevered arm.

Further objects, features and advantages of the invention will become apparent from consideration of the following description and the appended claims when taken in connection with the accompanying drawings.

DETAILED DESCRIPTION OF THE PREFERRED EMBODIMENT

Figure 1:
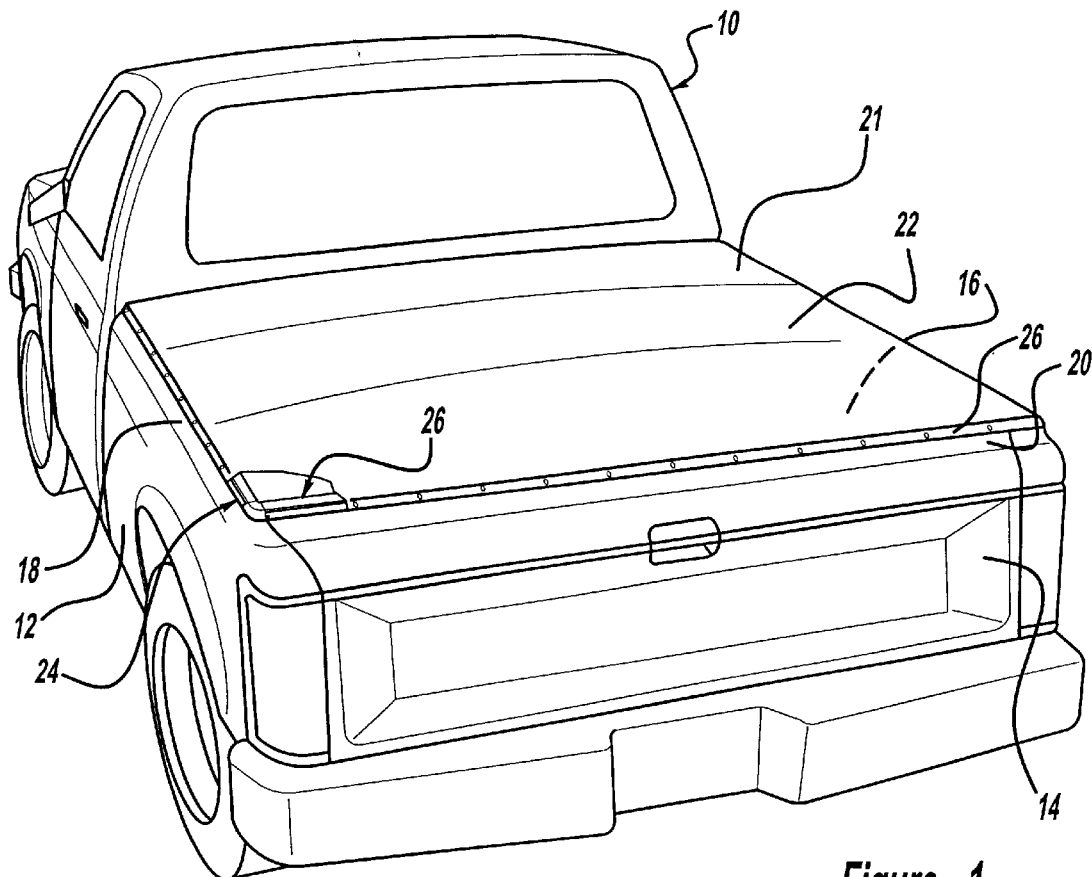
FIG. 1 is a perspective view of a pick-up truck with a tonneau cover employing the snap fasteners of the present invention.

With reference to FIG. 1, a pick-up truck 10 is shown having two side bed walls 12 and a rear wall 14 or tailgate surrounding the cargo box 16. While not shown, it will be understood that a front wall defines the forward extent of the cargo box. Each of the side bed walls 12 has a top surface 18 and the rear wall 14 also has a top surface 20.

A tonneau cover system 21, including a tonneau cover 22 sits atop the cargo area 16. Side frame rails 24 are mounted to the side bed wall top surfaces 18 by clamp (not shown) or other means. A rear frame rail 26 is mounted to extend across the rear wall top surface 18. Corner blocks 27 connect the side rails 24 to the end rails 26. As further described below, the tonneau cover 22 is attached to the side frame rails 24 and rear frame rail 26 (collectively, the frame 28) and covers the cargo box 16.

Figure 2:
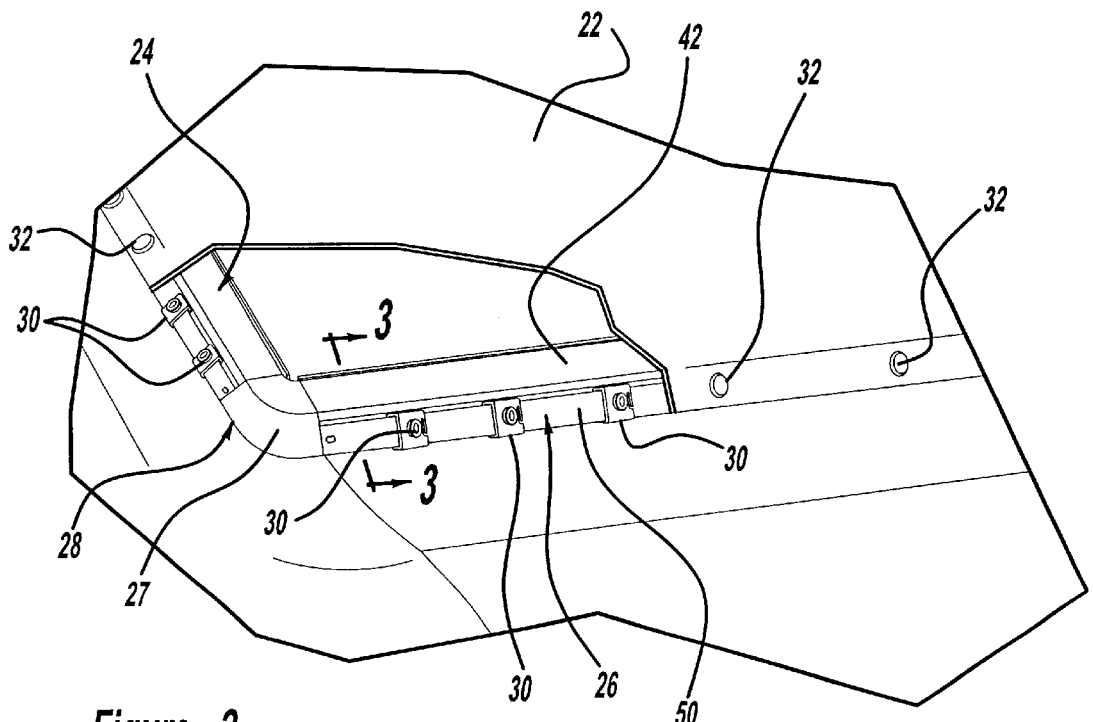
FIG. 2 is an enlarged perspective view of the left rear corner of the cargo box shown in FIG. 1 illustrating the corner of the tonneau frame.

With reference to FIG. 2, it can be seen that the tonneau cover 22 is a sheet of flexible material, such as vinyl, and has female engagement portions 32 attached about its periphery. These female engagement portions 32 match and engage with corresponding male engagement portions 30, slidably carried on the frame 28, and hold the tonneau cover 22 to the frame 28.

Figure 3:
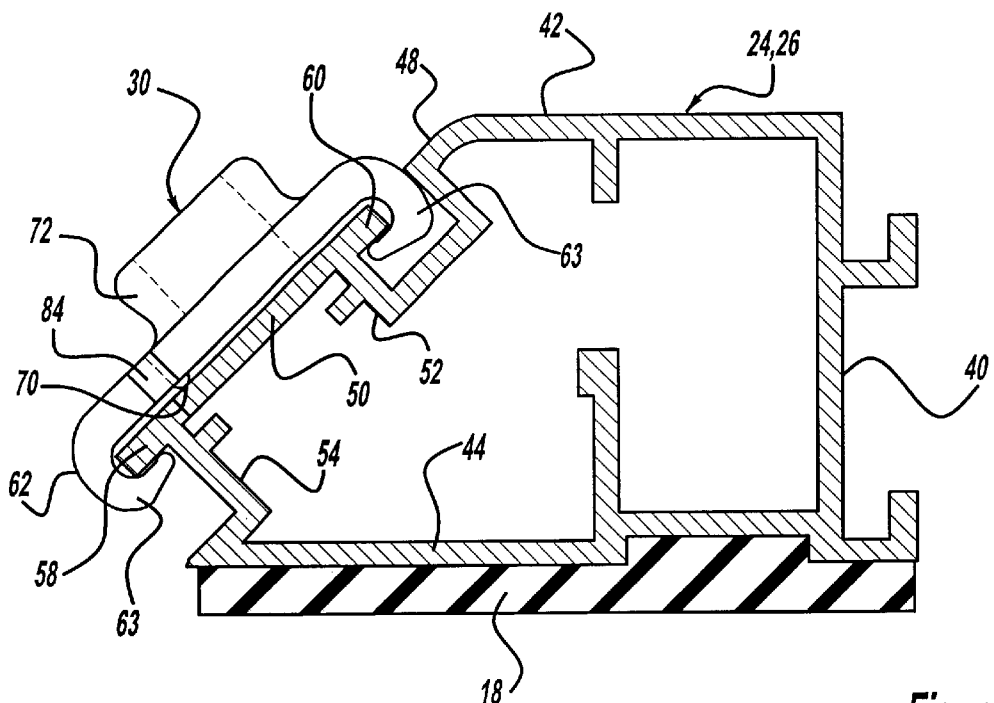
FIG. 3 is a sectional view of a portion of a snap fastener according to the present invention and mounted to the side rail.
Figure 4:
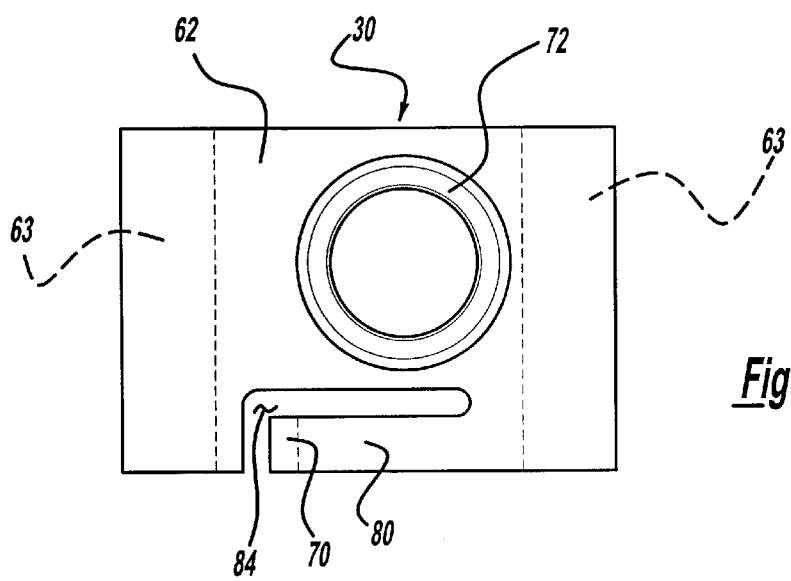
FIG. 4 is a top view of the snap portion of the present invention.

The shape of the frame rails 24, 26 is best shown in FIG. 3. Each frame rail 24, 26 has a closed section shape with an inner wall 40, an upper wall 42 and a lower wall 44. An outer wall 48 slopes generally downwardly and outwardly from the upper wall 42 to the lower wall 44. The outer wall 48 is interrupted by the snap mounting wall 50. The snap mounting wall 50 is coupled to the outer wall 48 by an upper connecting wall 52 and a lower connecting wall 54.

The snap mounting wall 50 further includes upper and lower side edges that extend beyond the connecting walls 52 and 54 forming over hanging flanges 58 and 60. It is about the overhanging flanges 58 and 60 that the male engagement portions 30 are retained on the frame 28.

Each male engagement portion 30 includes a C-shaped base 62 with a raised collar 72 protruding upward from the base 62. The collar 72 interferingly fits with the female engagement portions 32 on the tonneau cover 22. As thus described, it can be seen that the male and female engagement portions 30, 32 are parts of a snap fastener, with the female engagement portion 32 and the collar 72 of the male engagement member 30 being of conventional construction. Accordingly, these components are not discussed in further detail herein. Furthermore, it will be understood that a wide range of other fastening mechanisms can be employed in place of snap fasteners as specifically described and illustrated.

Figure 5:
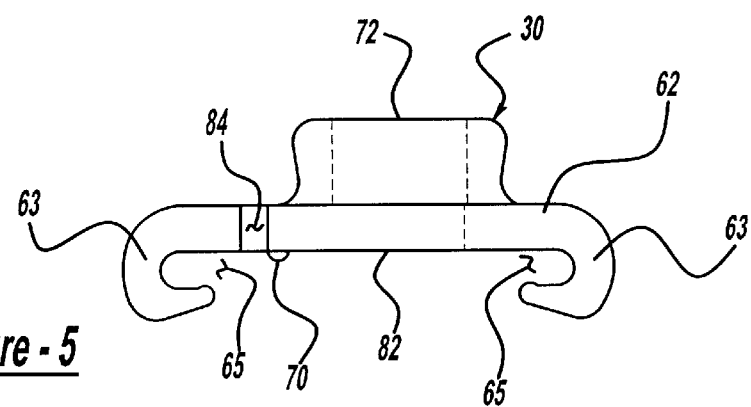
FIG. 5 is a side view of the snap portion shown in FIG. 4.
Figure 6:
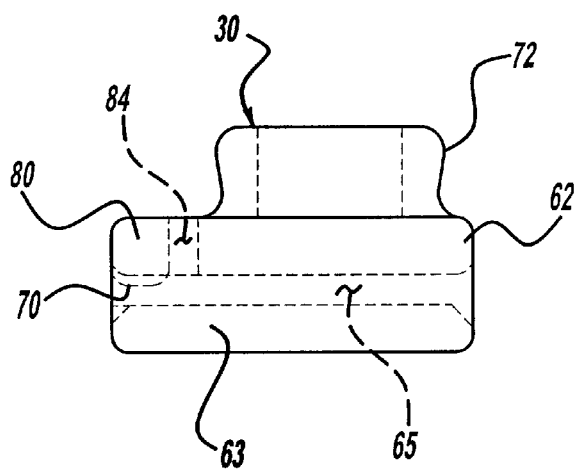
FIG. 6 is an end view of the snap portion shown in FIG. 4.

The C-shaped base 62 of the male engagement portion 30, as seen in FIGS. 3 and 5, is formed with two reversely bent ends 63. These ends 63, when mounted to snap mounting wall 50, extend about the overhanging flanges 58 and 60, capturing the male engagement portion 30 thereon. The ends 63 therefore define a gap 65 approximately the thickness of the flanges 58 and 60. At a maximum, this gap 65 is greater than the thickness of the flanges 58 and 60 and, at a minimum, is less than that thickness, but flexible and separable to allow the flanges 58 and 60 to be inserted therein.

Also formed on the base 62 is a projection or nib 70. The nib 70 may be one of a number of shapes (round, elongated, semispherical or other) and is formed on bottom surface 82 of the base 62 such that it projects toward the snap mounting wall 50. The height of the nib 70 is such that it causes the reversely bent ends 63 to be forced or pulled against the edges 58 and 60, securely retaining the male engagement portion 30 thereon.

In the preferred embodiment, the nib 70 is formed on a cantilevered arm 80 formed in the base 62 and defined therein by a slot or groove 84. By providing the arm 80, the amount of force exerted by the nib 70 can be relieved such that only one to ten pounds of force, and more preferably, about two to five pounds of force, is exerted through the nib 70. In this manner the force exerted by the nib 70 will retain the male engagement portion 30 in position on the rail 24, 26 when the tonneau cover 22 is not attached thereto and the vehicle 10 is moving. The force exerted by the nib 70 is also such that the male engagement portion 30 can be intentionally moved by an operator to relocate them along the rail 24, 26 and thereafter retained in position.

Figure 7:
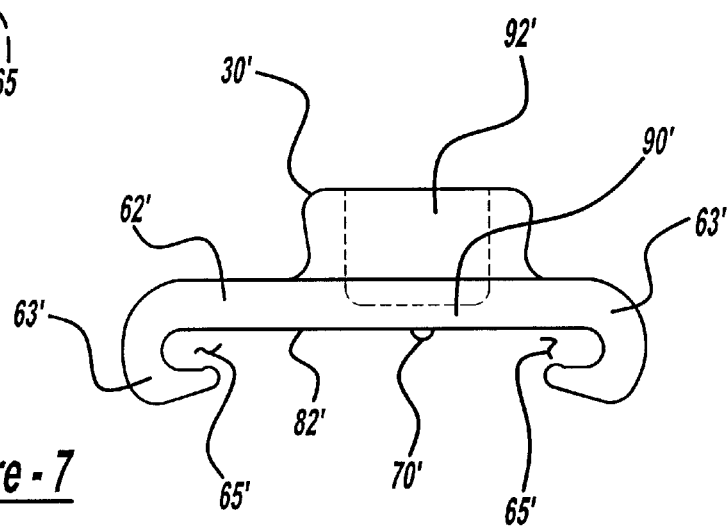
FIG. 7 is a side view of another embodiment of a snap portion of the present invention containing a nib protruding therefrom.

In another preferred embodiment, shown in FIG. 7, the nib 70' is formed centrally beneath the collar 72' on what is referred to as a flexible diaphragm 90'. The diaphragm 90' is formed by thinning that portion of the base 62' centrally within the collar 72'. In all other respects, the male engagement portion 30' operates and behaves as the prior embodiment. For this reason, like elements between the two embodiments bear like reference numbers with a prime (') designation.

In the preferred embodiment, the male engagement member 30 is formed of glass filled nylon, plastic or similar materials through an injection molding process. Other processes and materials, however, could alternatively be utilized. Further, the collar 72 may be formed on the base 62 off-center and toward one end thereof, as illustrated, to allow for adjustments in tension of the cover 22 based on seasonal temperature or other changes. Alternatively, the collar 72 may be centered on the base 62.

It is to be understood that the invention is not limited to the exact construction illustrated and described above, but that various changes and modifications may be made without departing from the spirit and scope of the invention as defined in the following claims.

I claim:

1. A tonneau cover system for a cargo box of a pick-up truck, said tonneau cover system comprising:
    a generally rectangular frame defined by a plurality of elongated rails connected to one another at ends thereof;
    a flexible cover of sheet material; and
    a plurality of fasteners, each fastener including a first portion coupled to said cover and a second portion mounted to one of said rails, said first and second portions being releasably engageable with one another, said second portion having a cantilevered arm and a protrusion, said protrusion projecting toward said rail and being in engagement with said rail with sufficient force to prevent inadvertent movement of said second portion when said cover and said portion are not engaged therewith while still permitting intentional free sliding movement by an operator of said second portion along said rail.

2. The tonneau cover system of claim 1 wherein said second portion includes a base having a bottom surface, said protrusion being formed on said bottom surface of said base.

3. The tonneau cover system of claim 1 wherein said protrusion is formed on said cantilevered arm.

4. The tonneau cover system of claim 1 wherein said second portion includes a C-shaped base having opposed returnly bent ends and a central portion therebetween.

5. The tonneau cover system of claim 4 wherein said central portion includes a bottom surface facing said rail, said protrusion being formed on said bottom surface.

6. The tonneau cover system of claim 1 wherein said fasteners are snap fasteners.

7. The tonneau cover system of claim 6 wherein said second portion includes a male part and said first portion includes a female part engageable with said male part.

8. The tonneau cover system of claim 7 wherein said male part includes a collar defining a recess centrally therein.

9. The tonneau cover system of claim 8 wherein said second portion includes a base, said protrusion being formed on one surface of said base and said male part being formed on an opposing surface of said base.

10. The tonneau cover system of claim 9 wherein said protrusion is formed opposite said recess.

11. The tonneau cover system of claim 9 wherein said protrusion is formed opposite said recess and generally within a diameter defined by said collar.

12. The tonneau cover system of claim 11 wherein said protrusion is generally centered within said diameter.

13. The tonneau cover system of claim 1 wherein said protrusion is semispherical in cross section.

14. The tonneau cover system of claim 1 wherein said protrusion is a raised rib.

15. A first half fastener for engaging a second half fastener and mounting a flexible cover to a frame of a tonneau cover for a cargo box of a pick-up truck, said first half fastener comprising:
    a base mountable with the frame for slidable movement therealong, said base including a cantilevered arm;

an engagement part being releasable and engageable with said second half fastener; and a protrusion formed on said base and engageable with said frame, said protrusion being frictionally engageable with sufficient force to prevent inadvertent movement of said first half portion along said frame when the cover and the second half fastener are not engaged therewith while also permitting intentional free sliding movement of said first half fastener by an operator.

16. A first half fastener of claim 15 wherein said protrusion is formed on a bottom surface of said base facing the frame when mounted thereto.

17. A first half fastener of claim 15 wherein said protrusion is formed on said cantilevered arm.

18. A first half fastener of claim 15 wherein said base is C-shaped and includes returnly bent ends with a central portion therebetween.

19. A first half fastener of claim 18 wherein said central portion includes a bottom surface facing said rail, said protrusion being formed on said bottom surface.

20. A first half fastener of claim 15 wherein said first half fastener is half of a snap fastener.

21. A first half fastener of claim 15 wherein said first half fastener is a male half of a snap fastener.

22. A first half fastener of claim 21 wherein said first half fastener includes a collar defining a recess therein.

23. A first half fastener of claim 22 wherein said protrusion is formed opposite said recess.

24. A first half fastener of claim 22 wherein said protrusion is formed opposite said recess and generally within a diameter defined by said collar.

25. A first half fastener of claim 24 wherein said protrusion is generally centered within said diameter.

26. A tonneau cover system for a cargo box of a pick-up truck, said tonneau cover system comprising:

a generally rectangular frame defined by a plurality of elongated rails connected to one another at ends thereof;

a flexible cover of sheet material; and a plurality of fasteners, each fastener including a first portion coupled to said cover and a second portion mounted to one of said rails, said first and second portions being releasably engageable with one another, said second portion including a C-shaped base having opposed returnly bent ends and a central portion therebetween, a cantilevered arm and a protrusion, said protrusion projecting toward said rail and being in engagement with said rail with sufficient force to prevent inadvertent movement of said second portion when said cover and said portion are not engaged therewith while still permitting intentional movement by an operator of said second portion along said rail.

27. The tonneau cover system of claim 26 wherein said protrusion is formed on said cantilevered arm.

28. The tonneau cover system of claim 26 wherein said central portion includes a bottom surface facing said rail, said protrusion being formed on said bottom surface.

29. The tonneau cover system of claim 26 wherein said fasteners are snap fasteners.

30. The tonneau cover system of claim 29 wherein said second portion includes a male part and said first portion includes a female part engageable with said male part.

31. The tonneau cover system of claim 30 wherein said male part includes a collar defining a recess centrally therein.

32. The tonneau cover system of claim 31 wherein said protrusion is formed on one surface of said base and said male part is formed on an opposing surface of said base.

33. The tonneau cover system of claim 32 wherein said protrusion is formed opposite said recess.

34. The tonneau cover system of claim 32 wherein said protrusion is formed opposite said recess and generally within a diameter defined by said collar.

35. The tonneau cover system of claim 34 wherein said protrusion is generally centered within said diameter.

36. The tonneau cover system of claim 26 wherein said protrusion is semispherical in cross section.

37. The tonneau cover system of claim 26 wherein said protrusion is a raised rib.

38. A first half fastener for engaging a second half fastener and mounting a flexible cover to a frame of a tonneau cover for a cargo box of a pick-up truck, said first half fastener comprising:

a C-shaped base including returnly bent ends with a central portion therebetween and a cantilevered arm, said base mountable with the frame for slidable movement therealong;

an engagement part being releasable and engageable with said second half fastener; and a protrusion formed on said base and engageable with said frame, said protrusion being frictionally engageable with sufficient force to prevent inadvertent movement of said first half portion along said frame when the cover and the second half fastener are not engaged therewith while also permitting intentional movement of said first half fastener by an operator.

39. A first half fastener of claim 38 wherein said protrusion is formed on said cantilevered arm.

40. A first half fastener of claim 38 wherein said central portion includes a bottom surface facing said rail, said protrusion being formed on said bottom surface.

41. A first half fastener of claim 38 wherein said first half fastener is half of a snap fastener.

42. A first half fastener of claim 38 wherein said first half fastener is a male half of a snap fastener.

43. A first half fastener of claim 42 wherein said first half fastener includes a collar defining a recess therein.

44. A first half fastener of claim 43 wherein said protrusion is formed opposite said recess.

45. A first half fastener of claim 43 wherein said protrusion is formed opposite said recess and generally within a diameter defined by said collar.

46. A first half fastener of claim 45 wherein said protrusion is generally centered within said diameter.

* * * * *